(12) United States Patent
Tsutamori et al.

(10) Patent No.: US 6,996,289 B1
(45) Date of Patent: Feb. 7, 2006

(54) IMAGE PROCESSING APPARATUS AND METHOD WHICH DEFINES ABNORMAL PIXELS BY READING DENSITY SIGNAL LEVELS

(75) Inventors: Yasuhiro Tsutamori, Kanagawa (JP); Masato Some, Kanagawa (JP); Takumi Suzuki, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 900 days.

(21) Appl. No.: 09/639,992

(22) Filed: Aug. 16, 2000

(30) Foreign Application Priority Data

Aug. 24, 1999 (JP) ................................. 11-237574

(51) Int. Cl.
*G06K 9/40* (2006.01)

(52) U.S. Cl. ....................... 382/275; 358/3.26; 348/241

(58) Field of Classification Search ........ 382/254–275; 358/3.26; 348/241, 246, 251
See application file for complete search history.

(56) References Cited

U.S. PATENT DOCUMENTS

| | | | |
|---|---|---|---|
| 4,672,437 A | * | 6/1987 | Casper ........................ 348/126 |
| 5,327,246 A | * | 7/1994 | Suzuki ........................ 348/246 |
| 5,903,659 A | * | 5/1999 | Kilgore ....................... 382/103 |
| 6,683,643 B1 | * | 1/2004 | Takayama et al. .......... 348/247 |

* cited by examiner

*Primary Examiner*—Samir Ahmed
*Assistant Examiner*—Charles Kim
(74) *Attorney, Agent, or Firm*—Sughrue Mion, PLLC

(57) ABSTRACT

A image processing apparatus includes an image data memory for storing digital image data obtained by photo-electrically detecting light with a CCD to produce analog image data and digitizing the analog pixel data, a window memory for two-dimensionally mapping and storing the digital image data stored in the image data memory, and an abnormal pixel determining section for specifying each pixel in the digital image data stored in the window memory as a subject pixel, reading the density signal level of the subject pixel together with the density signal levels of pixels adjacent to the subject pixel, comparing the density signal level of the subject pixel with the density signal levels of pixels adjacent to the subject pixel and defining the subject pixel as an abnormal pixel when difference between the density signal level of the subject pixel and the density signal levels of pixels adjacent to the subject pixel is greater than a predetermined level. According to the thus constituted image processing apparatus, it is possible remove specific dot-like black pixels and white pixels generated in an image produced based on image data obtained by digitizing analog image data produced using a CCD without affecting the entire image, thereby correcting the image.

25 Claims, 8 Drawing Sheets

Fig.8

| 150 | 120 | 100 |
|---|---|---|
| 100 | C<br>200 | 130 |
| 80 | 70 | 100 |

IMAGE PROCESSING APPARATUS AND METHOD WHICH DEFINES ABNORMAL PIXELS BY READING DENSITY SIGNAL LEVELS

BACKGROUND OF THE INVENTION

The present invention relates to an image processing apparatus and, particularly, to such an apparatus which can remove specific dot-like black pixels and white pixels generated in an image produced based on image data obtained by digitizing analog image data produced using a CCD without affecting the entire image, thereby correcting the image.

DESCRIPTION OF THE PRIOR ART

A chemiluminescence detecting system is known, which comprises the steps of selectively labeling a fixed high molecular substance such as a protein or a nucleic acid sequence with a labeling substance which generates chemiluminescent emission when it contacts a chemiluminescent substance, contacting the high molecular substance selectively labeled with the labeling substance and the chemiluminescent substance, photoelectrically detecting the chemiluminescent emission in the wavelength of visible light generated by the contact of the chemiluminescent substance and the labeling substance and producing digital image signals, effecting image processing thereon, and reproducing a chemiluminescent image on a display means such as a CRT or a recording material such as a photographic film, thereby obtaining information relating to the high molecular substance such as genetic information.

Further, a fluorescence system using a fluorescent substance as a labeling substance is known. According to this system, it is possible to study a genetic sequence, the expression level of a gene and to effect separation or identification of protein or estimation of the molecular weight or properties of protein or the like. For example, this system can perform a process including the steps of distributing a plurality of DNA fragments on a gel support by means of electrophoresis after a fluorescent dye was added to a solution containing a plurality of DNA fragments to be distributed or distributing a plurality of DNA fragments on a gel support containing a fluorescent dye or dipping a gel support on which a plurality of DNA fragments have been distributed by means of electrophoresis in a solution containing a fluorescent dye, thereby labeling the electrophoresed DNA fragments, exciting the fluorescent dye by a stimulating ray to cause it to release fluorescent light, detecting the released fluorescent light to produce an image and detecting the distribution of the DNA fragments on the gel support. This system can also perform a process including the steps of distributing a plurality of DNA fragments on a gel support by means of electrophoresis, denaturing the DNA fragments, transferring at least a part of the denatured DNA fragments onto a transfer support such as a nitrocellulose support by the Southern-blotting method, hybridizing a probe prepared by labeling target DNA and DNA or RNA complementary thereto with the denatured DNA fragments, thereby selectively labeling only the DNA fragments complementary to the probe DNA or probe RNA, exciting the fluorescent dye by a stimulating ray to cause it to release fluorescent light, detecting the released fluorescent light to produce an image and detecting the distribution of the target DNA on the transfer support. This system can further perform a process including the steps of preparing a DNA probe complementary to DNA containing a target gene labeled by a labeling substance, hybridizing it with DNA on a transfer support, combining an enzyme with the complementary DNA labeled by a labeling substance, causing the enzyme to contact a fluorescent substance, transforming the fluorescent substance to a fluorescent substance having fluorescent light releasing property, exciting the thus produced fluorescent substance by a stimulating ray to release fluorescent light, detecting the fluorescent light to produce an image and detecting the distribution of the target DNA on the transfer support. This fluorescence detecting system is advantageous in that a genetic sequence or the like can be easily detected without using a radioactive substance.

In the chemiluminescence detecting system and fluorescence detecting system, chemiluminescent images and fluorescent images are generally produced by detecting chemiluminescence and fluorescence using a CCD camera, particularly, a cooled CCD camera.

In the case where an image is photoelectrically detected using a CCD camera, thereby producing digital image data, and an image is reproduced based on the thus obtained digital image data, it is known that specific black pixels and white pixels are generated dot-like in the image. Conventionally, these dot-like pixels have generally been removed by correcting the digital image data using a smoothing filter such as a median filter.

However, when the digital image data are corrected using a smoothing filter, smoothing is also inevitably effected on pixels other than the specific black pixels and white pixels. The dot-like pixels can be removed from the image but the smoothing makes the edges of image unclear and affects the image as a whole.

In particular, in the chemiluminescence detecting system and the fluorescence detecting system, which are required to define a region of interest in an image and effect quantitative analysis thereon, if the digital image data are corrected using a smoothing filter, density values of pixels in the region of interest to be quantitatively analyzed change, thereby causing serious problems.

SUMMARY OF THE INVENTION

It is therefore an object of the present invention to provide an image processing apparatus which can remove specific dot-like black pixels and white pixels generated in an image produced based on image data obtained by digitizing analog image data produced using a CCD without affecting the entire image, thereby correcting the image.

The above other objects of the present invention can be accomplished by an image processing apparatus comprising image data storing means for storing digital image data obtained by photoelectrically detecting light with a CCD to produce analog image data and digitizing the analog pixel data, memory means for two-dimensionally mapping and storing the digital image data stored in the image data storing means, and abnormal pixel determining means for specifying each pixel in the digital image data stored in the memory means as a subject pixel, reading density signal level of the subject pixel together with density signal levels of pixels adjacent to the subject pixel, comparing the density signal level of the subject pixel with the density signal levels of pixels adjacent to the subject pixel and defining the subject pixel as an abnormal pixel when difference between the density signal level of the subject pixel and the density signal levels of pixels adjacent to the subject pixel is greater than a predetermined level.

According to the present invention, the image processing apparatus includes the abnormal pixel determining means for specifying each pixel in the digital image data stored in the memory means as a subject pixel, reading density signal level of the subject pixel together with density signal levels of pixels adjacent to the subject pixel, comparing the density signal level of the subject pixel with the density signal levels of pixels adjacent to the subject pixel and defining the subject pixel as an abnormal pixel when difference between the density signal level of the subject pixel and the density signal levels of pixels adjacent to the subject pixel is greater than a predetermined level. Therefore, in the case where an image includes specific dot-like black pixels and white pixels as a result of producing the image based on digital image data produced by photoelectrically detecting light with a CCD, it is determined whether or not each pixel corresponds to a specific dot-like black pixel or white pixel and when it is judged that the pixel is an abnormal pixel corresponding to a specific dot-like black pixel or white pixel, it is possible to correct the density signal level of the pixel individually in a desired manner. Accordingly, unlike the conventional correction processing in which the digital image data is corrected using a smoothing filter such as a median filter to remove these specific dot-like black pixels and white pixels, it is possible to prevent edges of the image from becoming unclear. Moreover, in the chemiluminescence detection system and the fluorescence detection system required to define a region of interest in an image and effect quantitative analysis on the region of interest, it is possible to remove the specific dot-like black pixels and white pixels, while density values of pixels within the region of interest to be quantitatively analyzed can be reliably prevented from changing.

In a preferred aspect of the present invention, the image processing apparatus further comprises abnormal pixel correcting means for correcting the density signal level of each subject pixel in accordance with the density signal levels of the pixels adjacent to the subject pixel when the subject pixel is defined as an abnormal pixel by the abnormal pixel determining means.

According to this preferred aspect of the present invention, the abnormal pixel determining means is constituted so as to specify each pixel in the digital image data stored in the memory means as a subject pixel, read out density signal level of the subject pixel together with density signal levels of pixels adjacent to the subject pixel, compare the density signal level of the subject pixel with the density signal levels of pixels adjacent to the subject pixel and define the subject pixel as an abnormal pixel when difference between the density signal level of the subject pixel and the density signal levels of pixels adjacent to the subject pixel is greater than a predetermined level, and the abnormal pixel correcting means is constituted so as to correct the density signal level of the subject pixel defined as an abnormal pixel by the abnormal pixel determining means in accordance with the density signal levels of the pixels adjacent to the subject pixel. Therefore, in the case where an image includes specific dot-like black pixels and white pixels as a result of producing the image based on digital image data produced by photoelectrically detecting light with a CCD, it is determined whether or not each pixel corresponds to a specific dot-like black pixel or white pixel and when it is judged that the pixel is an abnormal pixel corresponding to a specific dot-like black pixel or white pixel, the density signal level of the pixel is corrected in accordance with the density signal levels of the pixels adjacent to the subject pixel. Accordingly, unlike the conventional correction processing in which the digital image data is corrected using a smoothing filter such as a median filter to remove these specific dot-like black pixels and white pixels, it is possible to prevent edges of the image from becoming unclear. Moreover, in the chemiluminescence detection system and the fluorescence detection system required to define a region of interest in an image and effect quantitative analysis on the region of interest, it is possible to remove the specific dot-like black pixels and white pixels, while density values of pixels within the region of interest to be quantitatively analyzed can be reliably prevented from changing.

In a further preferred aspect of the present invention, the abnormal pixel determining means is constituted so as to determine whether the density signal level of each subject pixel is higher than a maximum value of the density signal levels of the pixels adjacent to the subject pixel and whether or not the density signal level of the subject pixel is lower than a minimum value of the density signal levels of the pixels adjacent to the subject pixel, and judge whether or not the difference between the density signal level of the subject pixel and the density signal levels of pixels adjacent to the subject pixel is greater than the predetermined level when the density signal level of the subject pixel is higher than the maximum value of the density signal levels of the pixels adjacent to the subject pixel or when the density signal level of the subject pixel is lower than the minimum value of the density signal levels of the pixels adjacent to the subject pixel.

According to this preferred aspect of the present invention, the abnormal pixel determining means judges whether or not the difference between the density signal level of each subject pixel and the density signal levels of pixels adjacent to the subject pixel is greater than a predetermined level only when the density signal level of the subject pixel is higher than the maximum value of the density signal levels of the pixels adjacent to the subject pixel or only when the density signal level of the subject pixel is lower than the minimum value of the density signal levels of the pixels adjacent to the subject pixel. Therefore, calculation efficiency can be improved.

In a further preferred aspect of the present invention, the abnormal pixel determining means is constituted so as to calculate an average value A, the maximum value MAX and the minimum value MIN of the density signal levels of pixels adjacent to each subject pixel and judge that the difference between the density signal level of the subject pixel and the density signal levels of the pixels adjacent to the subject pixel is greater than the predetermined level when the density signal level x of the subject pixel satisfies:

$$x > A + (MAX - MIN) * n, \text{ or}$$

$$x < A - (MAX - MIN) * n$$

wherein n is a positive constant.

According to this preferred aspect of the present invention, in the case where the density signal level of a subject pixel is higher or lower than the density signal levels of the pixels adjacent to the subject pixel but the subject pixel does not correspond to a specific dot-like black pixel or white pixel, the subject pixels can be prevented from being erroneously judged as abnormal pixels corresponding to specific dot-like black pixels or white pixels and subject pixels corresponding to specific dot-like black pixels or white pixels can be reliably judged as abnormal pixels.

In a further preferred aspect of the present invention, the positive constant n is set between 1 and 2.

According to this preferred aspect of the present invention, it is possible to prevent a subject pixel that is an abnormal pixel corresponding to a specific black pixel or white pixel from being erroneously judged as not an abnormal pixel owing to the positive constant n being set too great and to also prevent a subject pixel that is not an abnormal pixel corresponding to a specific black pixel or white pixel from being erroneously judged as an abnormal pixel owing to the positive constant n being set too small. Therefore, subject pixels corresponding to specific black pixels or white pixels can be more reliably judged as abnormal pixels.

In a further preferred aspect of the present invention, the abnormal pixel correcting means is constituted so as to correct the density signal level of each subject pixel in such a manner that the corrected density signal level is equal to an average value of the density signal levels of the pixels adjacent to the subject pixel excluding the pixels whose density signal levels have the maximum value and the minimum value.

According to this preferred aspect of the present invention, in the case where the pixels adjacent to the subject pixel include an abnormal pixel whose density signal level is abnormally higher or abnormally lower than the density signal levels of the pixels adjacent to the subject pixel and which is deemed to be an abnormal pixel corresponding to a specific dot-like black pixel or white pixel, it is possible to reliably prevent the density signal level of the subject pixel judged as an abnormal pixel from being affected by the abnormal pixel included among the pixels adjacent to the subject pixel and improperly corrected.

In a further preferred aspect of the present invention, the pixels adjacent to the subject pixel are the group of pixels obtained by excluding the subject pixel from 3*3 pixels including the subject pixel as a center pixel.

According to this preferred aspect of the present invention, it is possible, by simple calculation processing, to determine whether or not the subject pixel corresponds to an abnormal pixel and correct the density signal level of the subject pixel when the subject pixel is judged as an abnormal pixel.

The above and other objects and features of the present invention will become apparent from the following description made with reference to the accompanying drawings.

BRIEF DESCRIPTION OF THE DRAWINGS

FIG. 8 is a drawing notionally showing data of 3*3 pixels including a subject pixel as a center pixel that are fed to an abnormal pixel determining section.

DESCRIPTION OF THE PREFERRED EMBODIMENT

Figure 1:
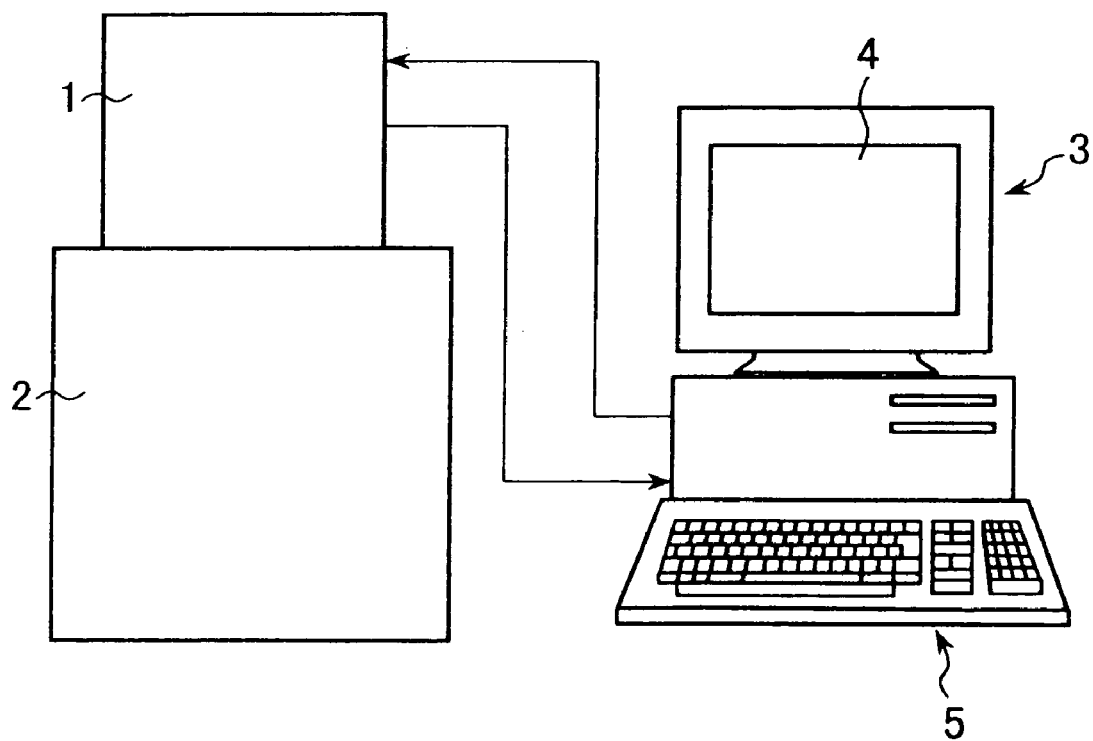
FIG. 1 is a schematic front view showing an image producing system for producing a fluorescent image to be processed by an image processing apparatus which is a preferred embodiment of the present invention.

FIG. 1 is a schematic front view showing an image producing system for producing a fluorescent image to be processed by an image processing apparatus which is a preferred embodiment of the present invention. The image producing system is constituted so as produce a visible image by detecting fluorescent light released from an image carrier carrying an image of a fluorescent substance or chemiluminescent emission generated by the contact of a chemiluminescent substance and a labeling substance.

As shown in FIG. 1, an image producing system includes a cooled CCD camera 1, a dark box 2 and a personal computer 3. As shown in FIG. 1, the personal computer 3 is equipped with a CRT 4 and a keyboard 5.

Figure 2:
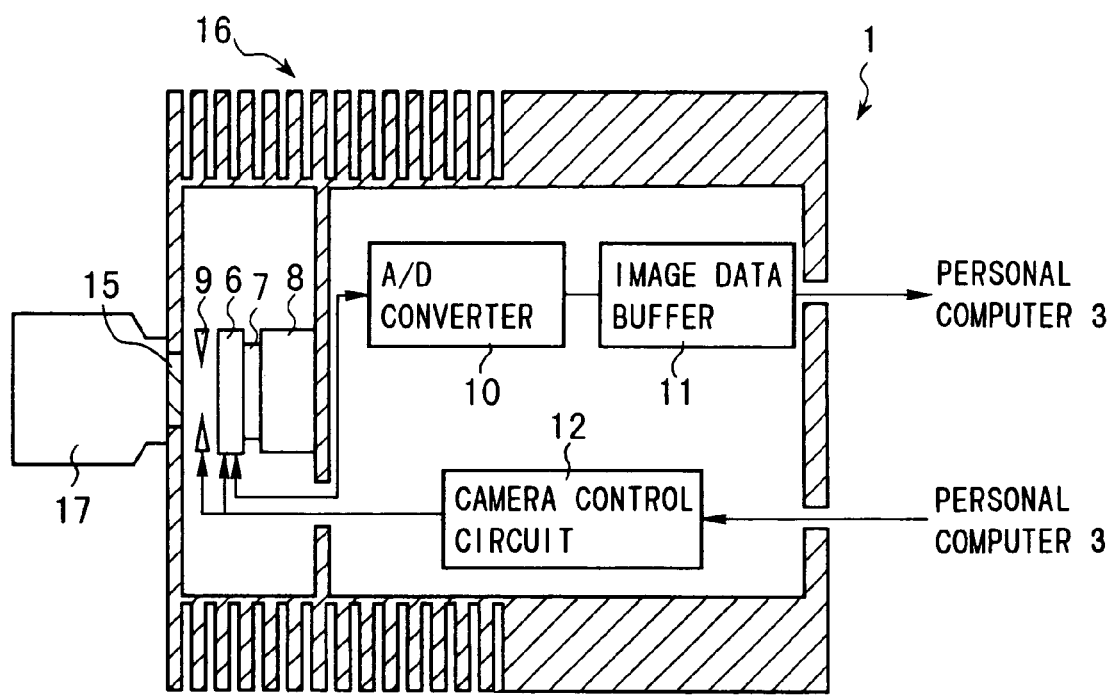
FIG. 2 is a schematic longitudinal cross sectional view showing a cooled CCD camera.

FIG. 2 is a schematic longitudinal cross sectional view showing the cooled CCD camera 1.

As shown in FIG. 2, the cooled CCD camera 1 includes a CCD 6, a heat transfer plate 7 made of metal such as aluminum, a Peltier element 8 for cooling the CCD 6, a shutter 9 disposed in front of the CCD 6, an A/D converter 10 for converting analog image data produced by the CCD to digital image data, an image data buffer 11 for temporarily storing image digitized by the A/D converter 10, and a camera control circuit 12 for controlling the operation of the cooled CCD camera 1. An opening formed between the dark box 2 and the cooled CCD camera 1 is closed by a glass plate 15 and the periphery of the cooled CCD camera 1 is formed with heat dispersion fins 16 over substantially half its length for dispersing heat.

A camera lens 17 disposed in the dark box 2 is mounted on the front surface of the glass plate 15 disposed in the cooled CCD camera 1.

Figure 3:
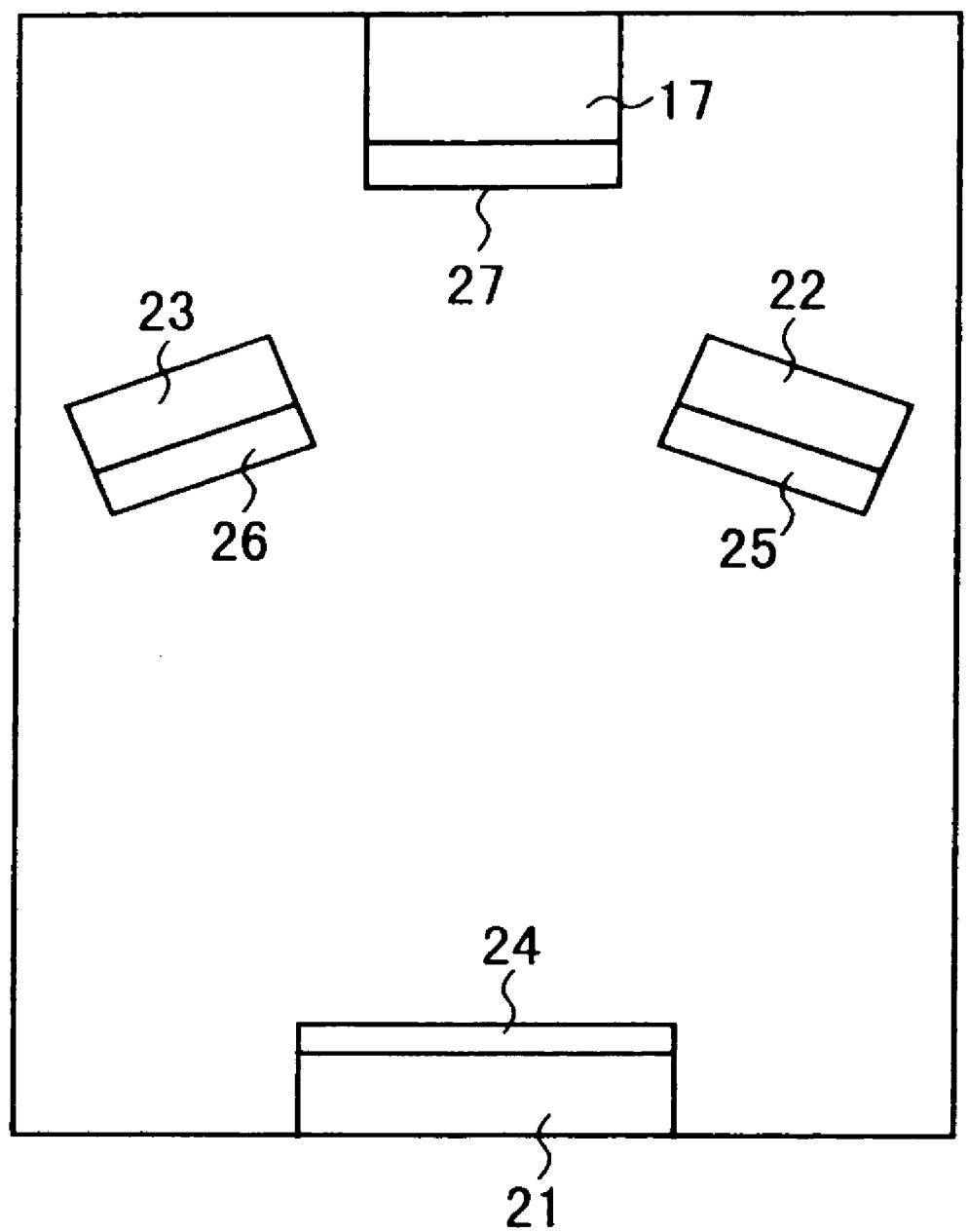
FIG. 3 is a schematic vertical cross sectional view showing a dark box.

FIG. 3 is a schematic vertical cross sectional view showing a dark box 2.

As shown in FIG. 3, the dark box 2 is equipped with a first blue light emitting diode stimulating ray source 21 for emitting a stimulating ray whose center wavelength is 450 nm, and a second blue light emitting diode stimulating ray source 22 and a third blue light emitting diode stimulating ray source 23 are provided obliquely above the first blue light emitting diode stimulating ray source 21, each being adapted for emitting a stimulating ray whose center wavelength is 450 nm. A filter 24 is adhered to the upper surface of the first blue light emitting diode stimulating ray source 21 and filters 25, 26 are respectively adhered to the front surfaces of the second blue light emitting diode stimulating ray source 22 and the third blue light emitting diode stimulating ray source 23. The filters 24, 25, 26 cut light of wavelengths other than one in the vicinity of 450 nm and harmful to the stimulation of a fluorescent substance and transmit light having a wavelength in the vicinity of 450 nm. A filter 27 for cutting the stimulating ray having a wavelength in the vicinity of 450 nm is detachably provided on the front surface of the camera lens 17.

Figure 4:
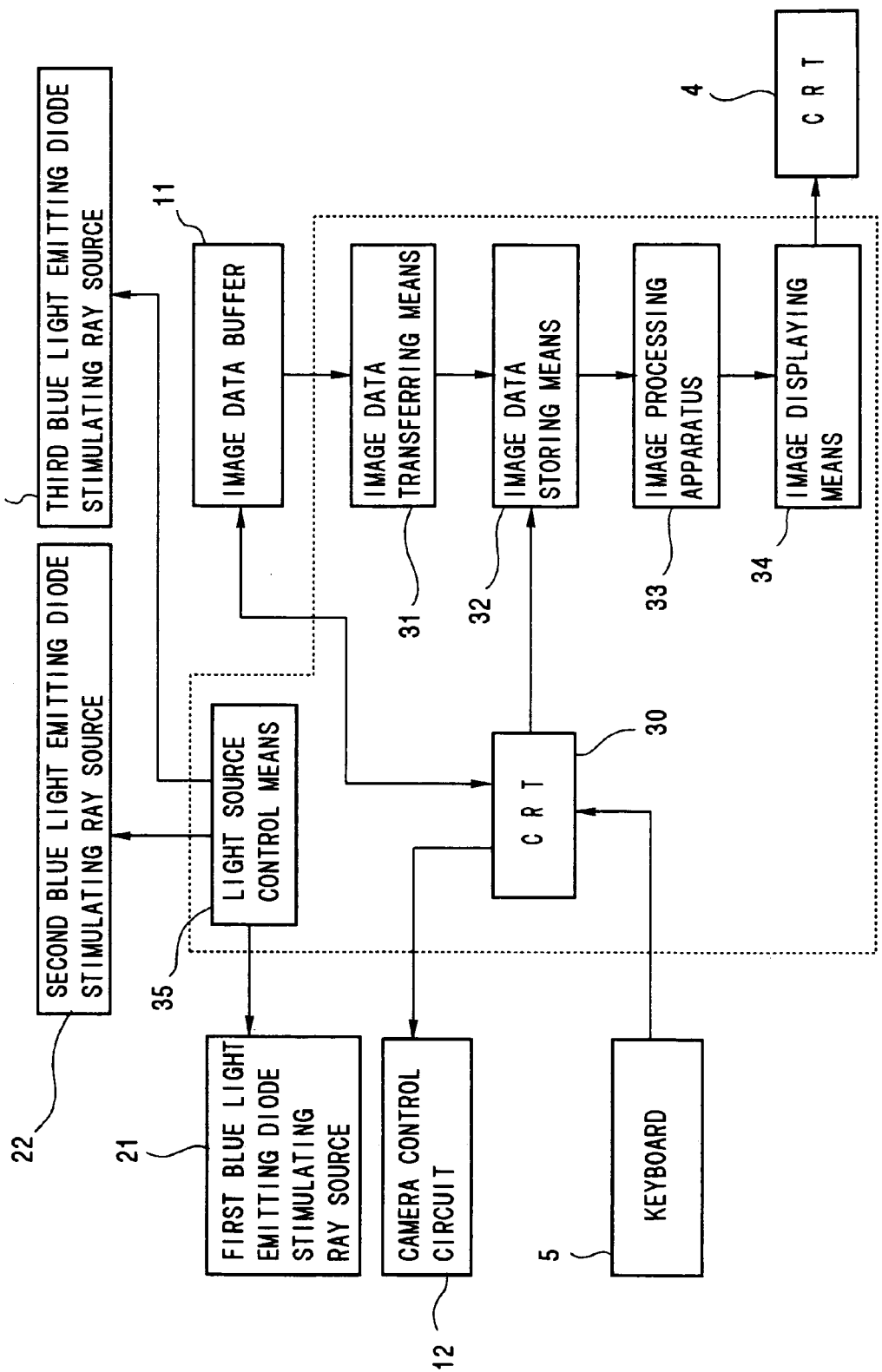
FIG. 4 is a block diagram of a personal computer and peripheral devices thereof.

FIG. 4 is a block diagram of the personal computer 3 and peripheral devices thereof.

As shown in FIG. 4, the personal computer 3 includes a CPU 30 for controlling the exposure of the cooled CCD camera 1, an image data transferring means 31 for reading the image data produced by the cooled CCD camera 1 from the image data buffer 11, an image data storing means 32 for storing image data, an image processing apparatus 33 for effecting image processing on the image data stored in the image data storing means 32, and an image displaying means 34 for displaying a visual image on the screen of the CRT 4 based on the image data stored in the image data storing means 32. The first blue light emitting diode stimulating ray source 21, the second blue light emitting diode stimulating ray source 22 and the third blue light emitting diode stimulating ray source 23 are controlled by a light source control means 35 and an instruction signal can be input via the CPU 30 to the light source control means 35 through the keyboard 5. The CPU 30 is constituted so as to output various signals to the camera controlling circuit 13 of the cooled CCD camera 1.

Figure 5:
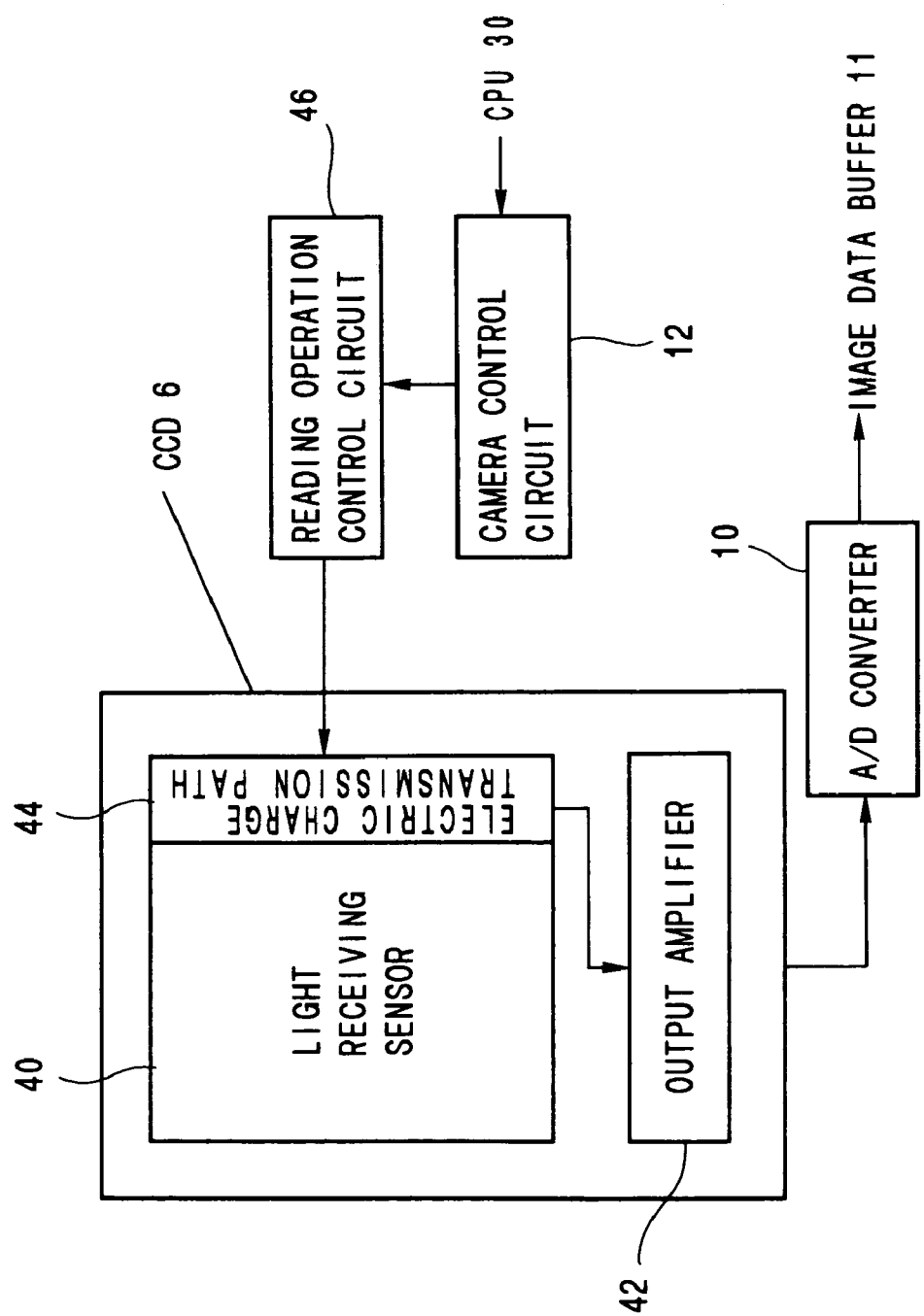
FIG. 5 is a block diagram of a cooled CCD camera and peripheral circuits thereof.

FIG. 5 is a block diagram of a cooled CCD camera and peripheral circuits thereof.

As shown in FIG. 5, the CCD 6 has a light receiving sensor 40 and an output amplifier 42. Electric charges accumulated in the light receiving sensor 40 are fed via an electric charge transmission path 44 to the output amplifier 42 to be output. The transmission of electrical charges through the electric charge transmission path 44 is controlled by a reading operation control circuit 46 and the reading operation control circuit 46 is controlled by the camera control circuit 12.

The image producing system including the cooled CCD camera shown in FIGS. 1 to 5 is constituted so as to produce a fluorescent image or a chemiluminescent image by detecting fluorescent light released from an image carrier carrying an image of a fluorescent substance or chemiluminescent emission generated by the contact of a chemiluminescent substance and a labeling substance. When a fluorescent image is to be produced, the image producing system detects fluorescent light released from an image carrier carrying an image of a fluorescent substance to produce a visible image in the manner described below. As termed in this specification, an image carrier carrying an image of a fluorescent substance includes an image carrier carrying an image of a specimen labeled with a fluorescent substance and an image carrier carrying an image of a fluorescent substance obtained by combining an enzyme with a labeled specimen, contacting the enzyme and a fluorescent substrate, thereby changing the fluorescent substrate to a fluorescent substance capable of emitting fluorescent light.

First, the first blue light emitting diode stimulating ray source 21, or the second blue light emitting diode stimulating ray source 22 and the third blue light emitting diode stimulating ray source 23 are turned on by the user and the lens focus is adjusted using the camera lens 17. An image carrier (not shown) is then placed on the filter 24 and the dark box 2 is closed. When the user inputs an exposure start signal through the keyboard 5, the first blue light emitting diode stimulating ray source 21, or the second blue light emitting diode stimulating ray source 22 and the third blue light emitting diode stimulating ray source 23 are again turned on by the light source control means 35, thereby emitting a stimulating ray toward the image carrier. At the same time, the exposure start signal is input via the CPU 30 to the camera control circuit 12 of the cooled CCD camera 1 and the shutter 9 is opened by the camera control circuit 12, whereby the exposure of the CCD 6 is started.

Light components of wavelengths not in the vicinity of 450 nm are cut by the filters 24, 25, 26 from the stimulating ray emitted from the first blue light emitting diode stimulating ray source 21, or the second blue light emitting diode stimulating ray source 22 and the third blue light emitting diode stimulating ray source 23. As a result, the fluorescent substance contained in the image carrier is stimulated by light having a wavelength in the vicinity of 450 nm, thereby emitting fluorescent light.

The fluorescent light emitted from the fluorescent substance contained in the image carrier impinges on the light receiving surface of the CCD 6 of the cooled CCD camera 1 through the filter 27 and the camera lens 17 and forms an image thereon. The light receiving sensor 40 of the CCD 6 receives light of the thus formed image and accumulates it in the form of electric charges therein. In this embodiment, since light components of wavelengths in the vicinity of 450 nm equal to the stimulating ray wavelength are cut by the filter 27, only fluorescent light emitted from the fluorescent substance contained in the image carrier is received by the light receiving sensor 40 of the CCD 6.

When a predetermined exposure time has passed, the CPU 30 outputs an exposure completion signal to the camera control circuit 12 of the cooled CCD camera 1. When the camera controlling circuit 12 receives the exposure completion signal from the CPU 30, it drives the reading operation control circuit 46 so as to cause it to transfer the analog image data accumulated in the light receiving sensor 40 of the CCD 6 in the form of electric charge to the output amplifier 42 via the electric charge transmission path 44 at a low speed lower than 10 frames/second and to further transfer the analog image data to the A/D converter 10 to cause the A/D converter 10 to digitize the image data and to temporarily store the thus digitized image data in the image data buffer 11.

At the same time, the CPU 30 outputs a data transfer signal to the image data transferring means 31 to cause it to read out the digital image data temporarily stored in the image data buffer 11 of the cooled CCD camera 1 and to input them to the image data storing means 32.

When the user inputs an image producing signal through the keyboard 5, the image data stored in the image data storing means 32 are read out by the image displaying means 35. The image data are subjected to image processing by the image processing apparatus 33 as occasion demands and a fluorescent image is displayed on the screen of the CRT 4 based on the thus processed image data.

On the other hand, when a chemiluminescent image is to be produced, chemiluminescent emission emitted from an image carrier is photoelectrically detected by the CCD 6 and an exposure completion signal is input from the CPU 30 to the camera control circuit 12 of the cooled CCD camera 1 after a predetermined exposure time has passed, thereby completing the production of a chemiluminescent image by the cooled CCD camera 1, similarly to the production of a fluorescent image except that the filter 27 is removed, that the image carrier for emitting chemiluminescent emission is set in place on the filter 24 and that chemiluminescent emission is detected while the first blue light emitting diode stimulating ray source 21, the second blue light emitting diode stimulating ray source 22 and the third blue light emitting diode stimulating ray source 23 are kept off. The chemiluminescent image data obtained in this manner are stored in the image data storing means 32 similarly to the fluorescent image data.

Figure 6:
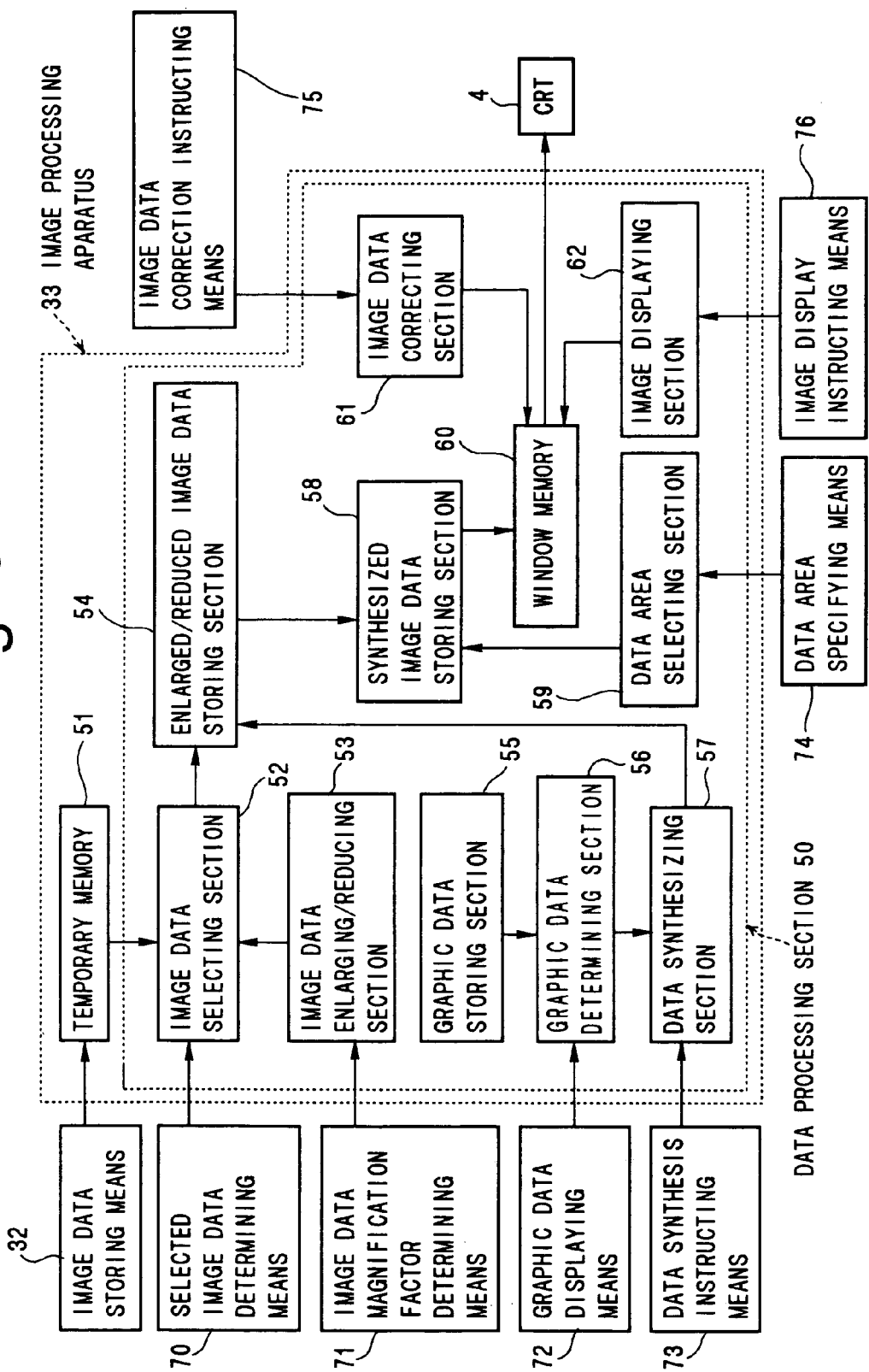
FIG. 6 is a block diagram of an image processing apparatus.

FIG. 6 is a block diagram of the image processing apparatus 33.

As shown in FIG. 6, the image processing apparatus 33 includes a data processing section 50 for effecting data processing and a temporary memory 51 for temporarily storing the image data stored in the image data storing means 32. The temporary memory 51 is constituted so as to two-dimensionally map the image data and temporarily stores them.

The image processing apparatus 33 further includes an image data selecting section 52 for selecting a part of the image data from among the image data temporarily stored in the temporary memory 51, an image data enlarging/reducing section 53 for enlarging or reducing the image data selected by the image data selecting section 52, an enlarged/reduced image data storing section 54 for two-dimensionally mapping and temporarily storing the image data enlarged or reduced by the image data enlarging/reducing section 53, a graphic data storing section 55 for storing various graphic data to be displayed on the CRT 4, a graphic data determining section 56 for selecting predetermined graphic data from among the graphic data stored in the graphic data storing section 55 and specifying the position and the size of the graphic data in order to superpose them on the image data two-dimensionally mapped and temporarily stored in the enlarged/reduced image data storing section 54, a data synthesizing section 57 for synthesizing the image data temporarily stored in the enlarged/reduced image data storing section 54 and the graphic data selected and whose position and size have been specified by the graphic data determining section 56, a synthesized image data storing section 58 for two-dimensionally mapping and temporarily storing the image data and the graphic data synthesized by the data synthesizing section 57, a data area selecting section 59 for selecting a predetermined data area from among the image data and the graphic data temporarily stored in the synthesized image data storing section 58, a window memory 60 for two-dimensionally mapping and temporarily storing the data in the data area of the image data and graphic data selected by the data area selecting section 59, an image data correcting section 61 for correcting the mage data two-dimensionally mapped and temporarily stored in the window memory 60, and an image displaying section 62 for reproducing an image on the screen of the CRT 4 based on the image data and the graphic data two-dimensionally mapped and temporarily stored in the window memory 60.

An image data selecting signal is input to the image data selecting section 52 from selected image data determining means 70, and an enlarging/reducing signal is input to the image data enlarging/reducing section 53 from image data magnification factor determining means 71. Further, a graphic data displaying signal is input to the graphic data determining section 56 from graphic data displaying means 72 and a data synthesizing signal is input to the data synthesizing section 57 from data synthesis instructing means 73 which determines what graphic data should be selected and how the image data and the graphic data are to be synthesized to be displayed on the screen of the CRT 4. Moreover, a data area specifying signal is input to the data area selecting section 59 from data area specifying means 74. Further, an image data correction signal is input to the image data correcting section 61 from image data correction instructing means 75 and an image display instructing signal is input to the image displaying section 62 from image display instructing means 76.

In this embodiment, the selected image data determining means 70, the image data magnification factor determining means 71, the graphic data displaying means 72, the data synthesis instructing means 73, the data area specifying means 74, the image data correction instructing means 75 and the image display instructing means 76 can be operated by a pointing device such as a mouse (not shown).

Figure 7:
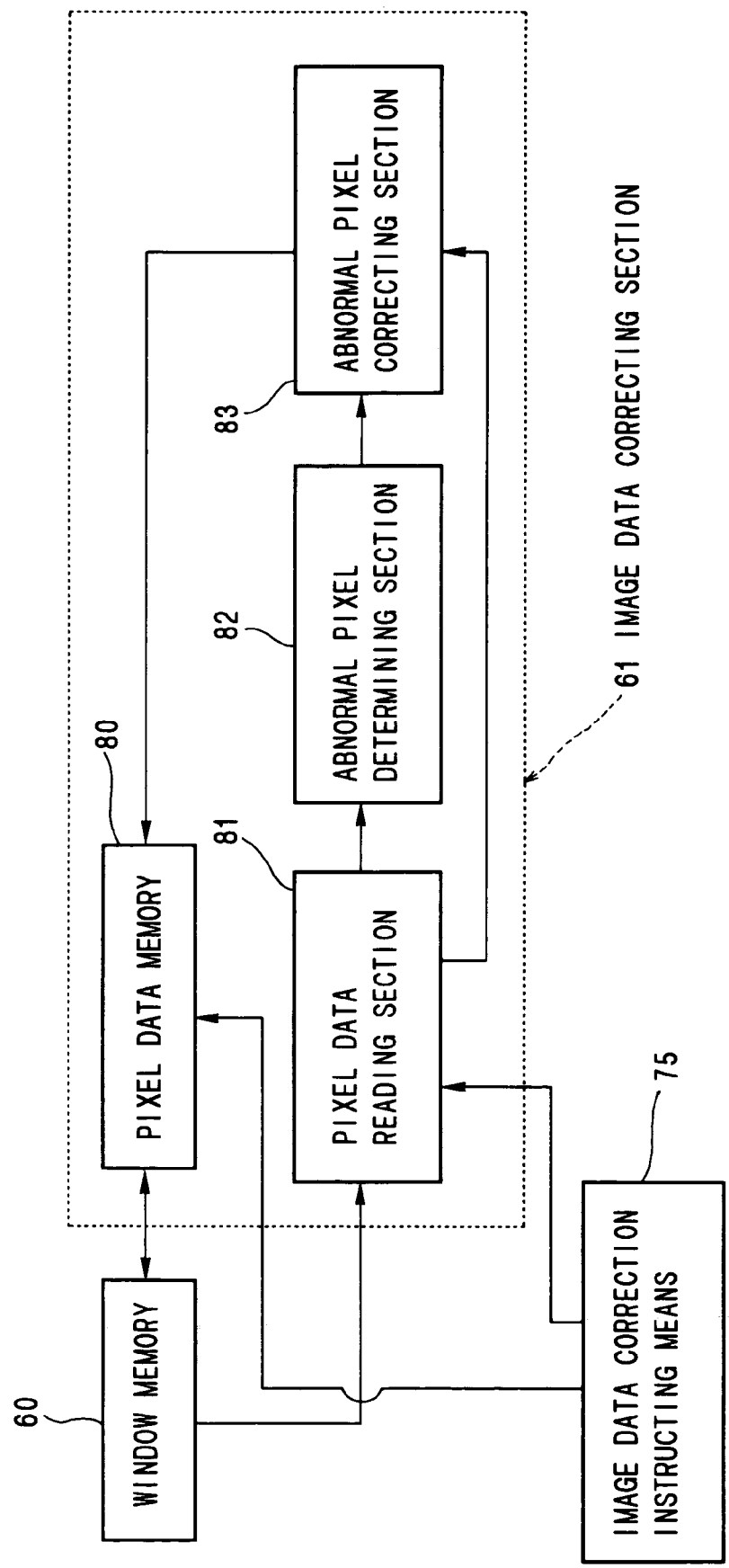
FIG. 7 is a block diagram of an image data correcting section.

FIG. 7 is a block diagram of the image data correcting section 61.

As shown in FIG. 7, the image data correcting section 61 includes an pixel data memory 80 for reading image data two-dimensionally mapped and temporarily stored in the window memory 60 and storing them, a pixel data reading section 81 for scanning the image data two-dimensionally mapped and temporarily stored in the window memory 60 pixel by pixel and reading pixel data consisting of 3*3 pixels in which a pixel scanned (referred to as "subject pixel") is positioned centrally, an abnormal pixel determining section 82 for determining based on the pixel data read out by the pixel data reading section 81 whether or not a subject pixel corresponds to an abnormal pixel specifically displayed on the screen of the CRT 4 as a black pixel or a white pixel caused by the reading of the CCD 6, and an abnormal pixel correcting section 83 for correcting the density signal level of the pixel determined as an abnormal pixel by the abnormal pixel determining section 82 and rewriting the density signal level of the pixel in the image data stored in the pixel data memory 80.

The thus constituted image processing apparatus according to an embodiment of the present invention displays a chemiluminescent image or a fluorescent image on the screen of the CRT 4 based on the image data stored in the image data storing means 32 in the following manner.

First, image data stored in the image data storing means 32 are two-dimensionally mapped and temporarily stored in the temporary memory 51. When the selected image data determining means 70 is operated, a part of the image data two-dimensionally mapped and stored in the temporary memory 51 is selected and two-dimensionally mapped and temporarily stored in the image data selecting section 52. The image data two-dimensionally mapped and stored in the image data selecting section 52 are then two-dimensionally mapped and stored in the enlarged/reduced image data storing section 54 without being enlarged or reduced and two-dimensionally mapped and stored in the synthesized image data storing section 58 without being synthesized with any graphic data. The image data two-dimensionally mapped and stored in the synthesized image data storing section 58 are two-dimensionally mapped and stored in the window memory 60 and an image is displayed on the screen of the CRT 4 based on the image data by operating the image display instructing means 76.

The user views the image displayed on the screen of the CRT 4 and, as occasion demands, operates the image data magnification factor determining means 71, thereby enlarging or reducing the image data two-dimensionally mapped and stored in the image data selecting section 52 and two-dimensionally mapping and storing the image data in the enlarged/reduced image data storing section 54. The image data two-dimensionally mapped and stored in the enlarged/reduced image data storing section 54 are then read out by the data synthesizing section 57 to be two-dimensionally mapped and stored in the synthesized image data storing section 58. When the user specifies a part of the image data two-dimensionally mapped and stored in the synthesized image data storing section 58 by operating the data area specifying means 74, the thus specified image data are forwarded into the window memory 60 and two-dimensionally mapped and stored therein. When the image display instructing means 76 is operated, an image is displayed on the screen of the CRT 4 by the image displaying section 62.

The image displayed on the screen of the CRT 4 in this manner often includes specific dot-like black pixels and white pixels caused by the fact that the image produced on the screen of the CRT 4 is based on image data obtained by photoelectrically detecting light emitted from an image carrier using the CCD 6 to produce analog image data and digitizing the analog data with the A/D converter 10. Such specific dot-like black pixels and white pixels have conventionally been removed by correcting the image data using a smoothing filter such as a median filter. However, when the digital image data are corrected using a smoothing filter, smoothing is inevitably also effected on pixels other than specific black pixels and white pixels. Thus, the dot-like pixels can be removed from the image, for example, but the edges of the image become unclear and the density values of pixels in the region of interest to be quantitatively analyzed change in the chemiluminescence detecting system and the fluorescence detecting system, whereby the image is affected as a whole.

Therefore, the image processing apparatus 33 according to this embodiment is constituted so that when the user views an image displayed on the screen of the CRT 4 and, as a result, judges that specific dot-like black pixels and white pixels are included in the image, the dot-like black pixels and white pixels can be removed from the image displayed on the screen of the CRT 4 by effecting image data correction in the image data correcting section 61 in the following manner.

When the user clicks an abnormal pixel removing button displayed in the screen of the CRT 4, the image data correction instructing means 75 is operated, thereby inputting an image data correction instructing signal to the image data correcting section 61.

When the image data correcting section 61 receives the image data correction instructing signal, it first stores image data two-dimensionally mapped and stored in the window memory 60 in the pixel data memory 80.

The image data correcting section 61 then seqentially reads out data of pixels in the image data two-dimensionally mapped and stored in the window memory 60 in such a manner that a fluorescent image displayed on the screen of the CRT 4 is scanned from the upper left end to the lower right end. The image data correcting section 61 is constituted so as to read out not only the data of the subject pixel to be read out but also the data in the vicinity of the subject pixel, specifically, density signal level data of 3*3 pixels including the subject pixel as a center pixel.

The 3*3 pixels including the subject pixel as a center pixel and read out by the image data correcting section 61 are output to the abnormal pixel determining section 82 and the abnormal pixel correcting section 83.

Figure 8:
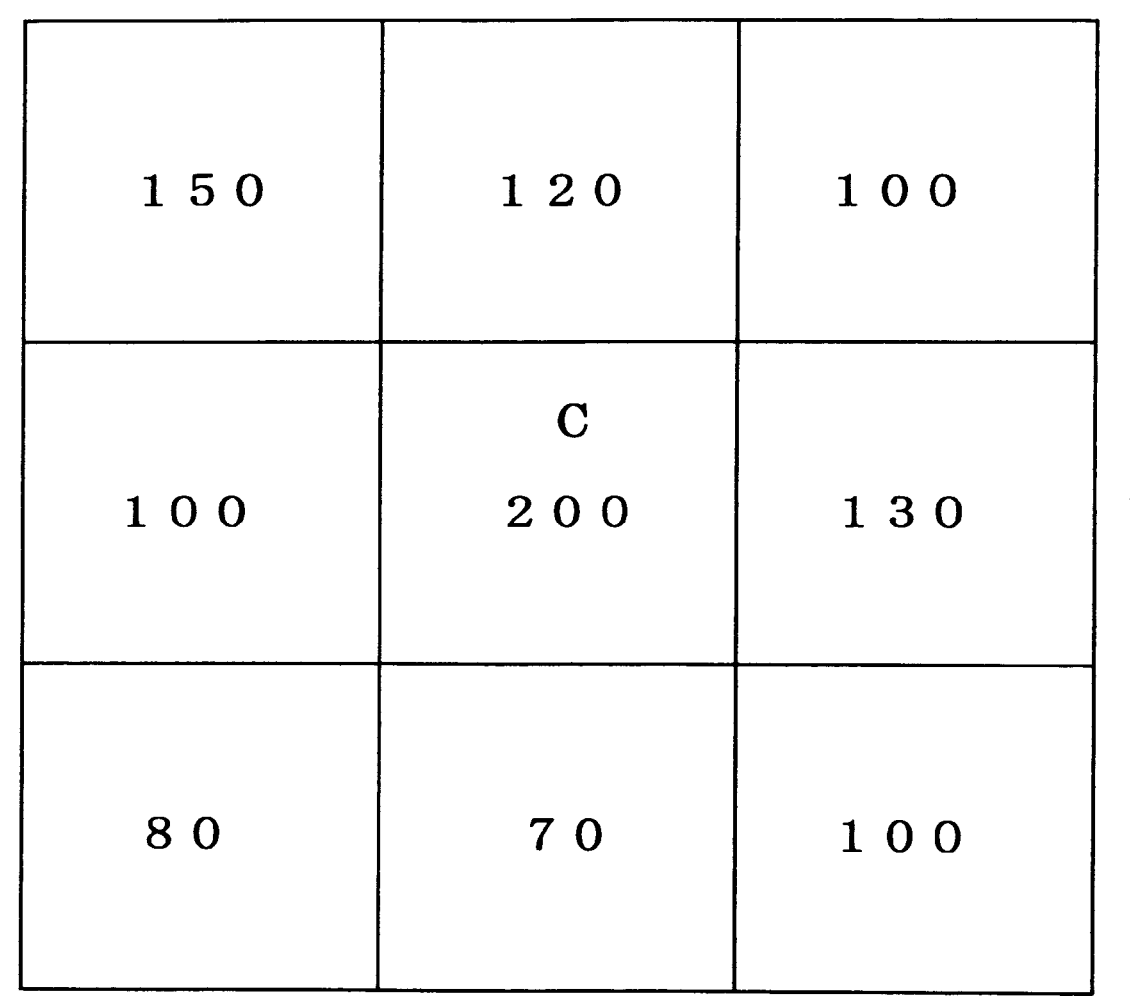

FIG. 8 is a drawing notionally showing data of 3*3 pixels including the subject pixel as a center pixel fed to the abnormal pixel determining section 82.

The 3*3 pixels including the subject pixel C as a center pixel have various density signal levels, as shown in the example of FIG. 8.

The specific dot-like black pixels and white pixels caused by the fact that the image produced on the screen of the CRT 4 is based on image data obtained by photoelectrically detecting light emitted from an image carrier using the CCD 6 to produce analog image data and digitizing the analog data with the A/D converter 10 generally have either abnormally high density signal levels or abnormally low density signal levels.

Therefore, the abnormal pixel determining section 82 determines whether the density signal level of the subject C pixel is maximum or minimum among the density signal levels of the 3*3 pixels.

When the density signal level of the subject pixel C is maximum among the density signal levels of the 3*3 pixels, there is a probability that the subject pixel C corresponds to a specific dot-like black pixel. However, even when the density signal level of the subject pixel C is maximum among the density signal levels of the 3*3 pixels, if the density signal level of the subject pixel C is not abnormally higher than the density signal levels of other pixels, it can be considered that the reason why the density signal level of the subject pixel C is maximum among the density signal levels of the 3*3 pixels might not be because the image produced on the screen of the CRT 4 is based on image data obtained by photoelectrically detecting light emitted from an image carrier using the CCD 6 to produce analog image data and digitizing the analog data with the A/D converter 10. Therefore, the abnormal pixel determining section 82 further calculates an average value A, the maximum value MAX and the minimum value MIN of the density signal levels of the 3*3 pixels excluding the subject pixel C and determines whether or not the density signal level x of the subject pixel C satisfies the following formula.

$$x > A + (MAX - MIN)*n$$

wherein n is a positive constant and is set between 1 and 2 in this embodiment.

If the result of the determination is YES, the density signal level x of the subject pixel C is abnormally higher than those of the 3*3 pixels other than the subject pixel C and it can be judged that the subject pixel C corresponds to a specific dot-like black pixel caused by the fact that the image produced on the screen of the CRT 4 is based on image data obtained by photoelectrically detecting light emitted from an image carrier using the CCD 6 to produce analog image data and digitizing the analog data with the A/D converter 10. Therefore, the abnormal pixel determining section 82 judges that the subject pixel C corresponds to a specific dot-like black pixel, i.e., an abnormal pixel, and outputs a correction signal to the abnormal pixel correcting section 83.

On the other hand, when the density signal level of the subject pixel C is minimum among the density signal levels of the 3*3 pixels, there is a probability that the subject pixel C corresponds to a specific dot-like white pixel. However, even when the density signal level of the subject pixel C is minimum among the density signal levels of the 3*3 pixels, if the density signal level of the subject pixel C is not abnormally lower than the density signal levels of other pixels, it can be considered that the reason why the density signal level of the subject pixel C is minimum among the density signal levels of the 3*3 pixels might not be because the image produced on the screen of the CRT 4 is based on image data obtained by photoelectrically detecting light emitted from an image carrier using the CCD 6 to produce analog image data and digitizing the analog data with the A/D converter 10. Therefore, the abnormal pixel determining section 82 further calculates the average value A, the maximum value MAX and the minimum value MIN of density signal levels of the 3*3 pixels excluding the subject pixel C and determines whether or not the density signal level x of the subject pixel C satisfies the following formula.

$$x < A - (MAX - MIN)*n$$

wherein n is a constant and is normally set between 1 and 2.

If the result of the determination is YES, the density signal level x of the subject pixel C is abnormally lower than those of the 3*3 pixels excluding the subject pixel C and it can be judged that the subject pixel C corresponds to the specific dot-like white pixel caused by the fact that the image produced on the screen of the CRT 4 is based on image data obtained by photoelectrically detecting light emitted from an image carrier using the CCD 6 to produce analog image data and digitizing the analog data with the A/D converter 10. Therefore, the abnormal pixel determining section 82 judges that the subject pixel C corresponds to the specific dot-like white pixel, i.e., an abnormal pixel, and outputs a correction signal to the abnormal pixel correcting section 83.

To the contrary, if the result of the determination is No, the abnormal pixel determining section 82 judges that the subject pixel C does not correspond to a specific dot-like white pixel and outputs a non-correction signal to the abnormal pixel correcting section 83.

On the other hand, when the density signal level of the subject pixel C is neither maximum nor minimum among the density signal levels of the 3*3 pixels, the abnormal pixel determining section 82 judges that the subject pixel C corresponds to neither a specific dot-like black pixel nor a specific dot-like white pixel and outputs a non-correction signal to the abnormal pixel correcting section 83.

When the abnormal pixel correcting section 83 receives a correction signal from the abnormal pixel determining section 82, it calculates the average value of the density signal level of six pixels among the 3*3 pixels excluding the subject pixel C, the pixel whose density signal level is maximum and the pixel whose density signal level is minimum based on the density signal level data of the 3*3 pixels including the subject pixel C as a center pixel and input from the image data reading section 81. The abnormal pixel correcting section 83 then allots the thus calculated average value to the density signal level x of the subject pixel C to rewrite the density signal level x of the subject pixel C in the image data two-dimensionally mapped and stored in the pixel data memory 80 and outputs an image data reading signal to the image data reading section 81.

On the other hand, when the abnormal pixel correcting section 83 receives a non-correction signal from the abnormal pixel determining section 82, it outputs an image data reading signal to the image data reading section 81 without rewriting the density signal level x of the subject pixel C two-dimensionally mapped and stored in the pixel data memory 80.

When the image data reading section 81 receives the image data reading signal from the abnormal pixel correcting section 83, it specifies a pixel adjacent to the subject pixel C as a next subject pixel and reads out density signal level data of 3*3 pixels including the next subject pixel C as a center pixel from the window memory 60. The image data correcting section 61 determines whether or not the next subject pixel C corresponds to an abnormal pixel in the same manner as explained above and when it determines that the next subject pixel C corresponds to an abnormal pixel, it effects the rewriting operation of the density signal level of the next subject pixel C.

In this manner, the image data reading section 81 seqentially reads out data of pixels in the image data two-dimensionally mapped and stored in the window memory 60 in such a manner that a fluorescent image displayed on the screen of the CRT 4 is scanned from the upper left end to the lower right end and the abnormal pixel determining section 82 determines whether or not each subject pixel C corresponds to an abnormal pixel. When the abnormal pixel determining section 82 determines that a subject pixel C corresponds to an abnormal pixel, the abnormal pixel correcting section 83 effects the rewriting operation of the density signal level of the next subject pixel C. When the pixel corresponding to the pixel located at the lower right end of the image displayed on the screen of the CRT 4 is specified as the subject pixel, whether or not the subject pixel corresponds to an abnormal pixel is determined and the rewriting operation of the density signal level of the abnormal pixel is completed, the abnormal pixel correcting section 83 outputs the image data stored in the pixel data memory 80 and in which the density signal levels of abnormal pixels have been rewritten to the window memory 60 and overwrites the image data two-dimensionally mapped and stored in the window memory 60 with the image data input from the abnormal pixel correcting section 83.

Thus, specific dot-like black pixels and white pixels caused by the fact that an image produced on the screen of the CRT 4 is based on image data obtained by photoelectrically detecting light emitted from an image carrier using the CCD 6 to produce analog image data and digitizing the analog data with the A/D converter 10 are removed from the fluorescent image based on the image data in which the density signal levels of the abnormal pixels have been corrected and a fluorescent image free from the specific dot-like black pixels and white pixels is displayed on the screen of the CRT 4.

According to the above described embodiment, the image data reading section 81 of the image data correcting section 61 seqentially reads out data of pixels in the image data two-dimensionally mapped and stored in the window memory 60 in such a manner that a fluorescent image displayed on the screen of the CRT 4 is scanned from the upper left end to the lower right end. The abnormal pixel determining section 82 determines whether or not the density signal level of each subject pixel C is maximum among the density signal levels of the 3*3 pixels including the subject pixel C as a center pixel and when the density signal level of the subject pixel C is maximum, it compares the density signal level of the subject pixel C with the average value, the maximum value and the minimum value of the density signal levels of the 3*3 pixels excluding the subject pixel C and determines whether or not the density signal level of the subject pixel C is abnormally higher than the density signal levels of the 3*3 pixels excluding the subject pixel C, thereby determining whether or not the subject pixel C is an abnormal pixel corresponding to a specific dot-like black pixel. On the other hand, the abnormal pixel determining section 82 determines whether or not the density signal level of the subject pixel C is minimum among the density signal levels of the 3*3 pixels including the subject pixel C as a center pixel and when the density signal level of the subject pixel C is minimum, it compares the density signal level of the subject pixel C with the average value, the maximum value and the minimum value of the density signal levels of the 3*3 pixels excluding the subject pixel C and determines whether or not the density signal level of the subject pixel C is abnormally lower than the density signal levels of the 3*3 pixels excluding the subject pixel C, thereby determining whether or not the subject pixel C is an abnormal pixel corresponding to a specific dot-like white pixel. When the abnormal pixel determining section 82 determines that the subject pixel C is an abnormal pixel corresponding to a specific dot-like black pixel or white pixel, the abnormal pixel correcting section 83 rewrites the density signal level of the subject pixel C in the image data two-dimensionally mapped and stored in the pixel data memory 80 so as to make it equal to the average value of the density signal levels of six pixels among the 3*3 pixels excluding the subject pixel C, the pixel whose density signal level is maximum and the pixel whose density signal level is minimum, and repeatedly effects the same rewriting operation on individual pixels in the image data two-dimensionally mapped and stored in the window memory 60. Therefore, it is possible to prevent edges of the image from becoming unclear as in the conventional case where a smoothing processing is effected on the entire image data.

Moreover, in the case where a region of interest is defined and quantitative analysis is effected on the region of interest in a chemiluminescence detection system or in a fluorescence detection system, it is possible to prevent the density signal levels of pixels included in the region of interest from changing, and thus to produce a clear image on the screen of the CRT 4, define a region of interest therein and effect quantitative analysis on the region of interest in a desired manner.

Further, according to the above described embodiment, based on the density signal levels of 3*3 pixels including a subject pixel C as a center pixel, it is determined whether or not the density signal level of the subject pixel C is maximum among the density signal levels of 3*3 pixels and when it is judged that the density signal level of the subject pixel C is not maximum, it is determined that the subject pixel C is not an abnormal pixel corresponding to a specific dot-like black pixel. Furthermore, it is determined whether or not the density signal level of the subject pixel C is minimum among the density signal levels of 3*3 pixels and when it is judged that the density signal level of the subject pixel C is not minimum, it is determined that the subject pixel C is not an abnormal pixel corresponding to a specific dot-like white pixel. When the density signal level of the subject pixel C is neither maximum nor minimum among the density signal levels of 3*3 pixels, since it is determined that the subject pixel C is not an abnormal pixel corresponding to a specific dot-like black pixel or white pixel and no further calculation is effected. The calculation efficiency can therefore be improved.

Moreover, according to the above described embodiment, the abnormal pixel correcting section 83 rewrites the density signal level of each subject pixel C in the image data two-dimensionally mapped and stored in the pixel data memory 80 so as to make it equal to the average value of the density signal levels of six pixels among the 3*3 pixels excluding the subject pixel C, the pixel whose density signal level is maximum and the pixel whose density signal level is minimum. Therefore, even in the case where the 3*3 pixels excluding the subject pixel C include an abnormal pixel corresponding to a specific dot-like black pixel or white pixel, it is possible to properly correct the density signal level of the subject pixel determined as an abnormal pixel corresponding to a specific dot-like black pixel or white pixel without being affected by the abnormal pixel included among the 3*3 pixels excluding the subject pixel C.

The present invention has thus been shown and described with reference to specific embodiments. However, it should be noted that the present invention is in no way limited to the details of the described arrangements but changes and modifications may be made without departing from the scope of the appended claims.

For example, in the above described embodiment, explanation is made as to the processing of image data obtained by detecting a chemiluminescent image or a fluorescent image by the CCD 6. However, the present invention is in no way limited to the processing of image data obtained by detecting a chemiluminescent image or a fluorescent image by the CCD 6 but can be widely applied to the correction of image data in order to remove specific dot-like black pixels and white pixels from an image produced based on image data obtained by digitizing analog image data produced using a CCD.

Further, in the above described embodiment, although it is judged whether or not a subject pixel corresponds to a specific dot-like black pixel or white pixel based on density signal levels of 3*3 pixels including the subject pixel as a center pixel, it is not absolutely necessary to make judgment based on the density signal levels of the 3*3 pixels including the subject pixel as a center pixel and it is possible to judge, based on, for example, the density signal levels of 5*5 pixels including the subject pixel as a center pixel or those of 7*7 pixels including the subject pixel as a center pixel, whether or not the subject pixel corresponds to a specific dot-like black pixel or white pixel.

Moreover, in the above described embodiment, the abnormal pixel determining section 82 determines whether or not the density signal level of the subject pixel C is maximum among the density signal levels of the 3*3 pixels including the subject pixel C as a center pixel and when the density signal level of the subject pixel C is maximum, it compares the density signal level of the subject pixel C with the average value, the maximum value and the minimum value of the density signal levels of the 3*3 pixels excluding the subject pixel C and determines whether or not the density signal level of the subject pixel C is abnormally higher than the density signal levels of the 3*3 pixels excluding the subject pixel C, thereby determining whether or not the subject pixel C is an abnormal pixel corresponding to a specific dot-like black pixel. On the other hand, the abnormal pixel determining section 82 determines whether or not the density signal level of the subject pixel C is minimum among the density signal levels of the 3*3 pixels including the subject pixel C as a center pixel and when the density signal level of the subject pixel C is minimum, it compares the density signal level of the subject pixel C with the average value, the maximum value and the minimum value of the density signal levels of the 3*3 pixels excluding the subject pixel C and determines whether or not the density signal level of the subject pixel C is abnormally lower than the density signal levels of the 3*3 pixels excluding the subject pixel C, thereby determining whether or not the subject pixel C is an abnormal pixel corresponding to a specific dot-like white pixel. However, it is sufficient to determine whether or not the subject pixel C corresponds to a specific dot-like black pixel or white pixel by judging whether or not the density signal level of the subject pixel C is abnormally higher or abnormally lower than the density signal levels of pixels adjacent to the subject pixel C and it is not absolutely necessary to determine whether or not the density signal level of the subject pixel C is maximum or minimum among the density signal levels of adjacent pixels and judge to what degree the density signal level of the subject pixel C is higher or lower than the density signal levels of adjacent pixels.

Further, in the above described embodiment, when the abnormal pixel determining section 82 determines that the subject pixel C corresponds to a specific dot-like black pixel or white pixel, the abnormal pixel correcting section 83 corrects the density signal level of the subject pixel C by rewriting the density signal level of the subject pixel C so as to make it equal to the average value of the density signal levels of six pixels among the 3*3 pixels excluding the subject pixel C, the pixel whose density signal level is maximum and the pixel whose density signal level is minimum. However, in the case where the maximum value and/or the minimum value of the density signal levels of the 3*3 pixels excluding the subject pixel C do not differ greatly from the average value of the density signal levels of the 3*3 pixels excluding the subject pixel C, the density signal level of the subject pixel C may be corrected by rewriting the density signal levels of the 3*3 pixels excluding the subject pixel C so as to make it equal to the average value of the density signal levels of the 3*3 pixels excluding the subject pixel but including the pixel whose density signal level is maximum and the pixel whose density signal level is minimum.

Moreover, in the above described embodiment, although the positive constant n is set between 1 and 2, it is not absolutely necessary to set the positive constant n between 1 and 2. As the positive constant n becomes smaller, it becomes more probable to determine that the subject pixel C is an abnormal pixel corresponding to a specific dot-like black pixel or white pixel and, therefore, there arises a risk of the subject pixel C being judged as an abnormal pixel although the subject pixel C is not an abnormal pixel corresponding to a specific dot-like black pixel or white pixel. On the other hand, as the positive constant n becomes larger, it becomes more probable to determine that the subject pixel C is not an abnormal pixel corresponding to a specific dot-like black pixel or white pixel and, therefore, there arises a risk of the subject pixel C being judged as not an abnormal pixel although the subject pixel C is an abnormal pixel corresponding to a specific dot-like black pixel or white pixel. Therefore, the positive constant n is preferably determined depending upon an obtained fluorescent image, more preferably, depending upon the density values of a fluorescent image within a region of interest to be quantitatively analyzed.

Further, in the above described embodiment, although the cooled CCD camera 1 is used, a CCD camera having no cooling means can be used depending upon the intensity of fluorescent light emitted from the fluorescent substance.

Furthermore, although in the above described embodiments, the first blue light emitting diode stimulating ray source 21, the second blue light emitting diode stimulating ray source 22 and the third blue light emitting diode stimulating ray source 23 are provided in the dark box 2, only the first blue light emitting diode stimulating ray source 21 or only the second blue light emitting diode stimulating ray source 22 and the third blue light emitting diode stimulating ray source 23 may be provided therein.

Moreover, although in the above described embodiments, the blue light emitting diode stimulating ray sources 21, 22, 23 for emitting stimulating rays with a center wavelength of 450 nm are used, light emitting diode stimulating ray sources for emitting stimulating rays with a center wavelength in the range between 400 nm and 700 nm may be employed depending on the kind of fluorescent substance.

Further, in the above described embodiment, when an exposure start signal is input through the keyboard 5, the first blue light emitting diode stimulating ray source 21 alone or the second blue light emitting diode stimulating ray source 22 and the third blue light emitting diode stimulating ray source 23 are turned on by the light source control means 35. However, it is not absolutely necessary to constitute the light source control means 35 so as to be controlled by the personal computer 3 and the light source control means 35 may be manually operated.

Furthermore, in the above described embodiment, the image producing system includes the filter 27 detachably mounted for cutting light having a wavelength in the vicinity of 450 nm and is constituted so as to be able to detect extremely weak chemiluminescent emission and produce a chemiluminescent image when the filter 27 is removed. However, the image producing system may be constituted so as to produce only a fluorescent image by the fluorescent detection system, in which case the filter 27 can be fixed to the front surface of the camera lens 16.

Moreover, in the above described embodiment, the image producing system includes the first blue light emitting diode stimulating ray source 21, the second blue light emitting diode stimulating ray source 22 and the third blue light emitting diode stimulating ray source 23. However, in the case where the image producing system is intended to be used for producing only a chemiluminescent image, the first blue light emitting diode stimulating ray source 21, the second blue light emitting diode stimulating ray source 22 and the third blue light emitting diode stimulating ray source 23 are unnecessary and the filters 24, 25, 26, 27 are also unnecessary.

Further, although in the above described embodiments, the cooled CCD camera 1 is formed with heat dispersion fins 16 over substantially half its length for dispersing heat released from the Peltier element 8, it is possible to form the heat dispersion fins 16 on the periphery of the cooled CCD camera 1 over its entire length and the arrangement of the heat dispersion fins 16 on the periphery of the cooled CCD camera 1 may be arbitrarily determined.

Furthermore, in the present invention, the respective means need not necessarily be physical means and arrangements whereby the functions of the respective means are accomplished by software fall within the scope of the present invention. In addition, the function of a single means may be accomplished by two or more physical means and the functions of two or more means may be accomplished by a single physical means.

According to the present invention, it is possible to provide an image processing apparatus which can remove specific dot-like black pixels and white pixels generated in an image produced based on image data obtained by digitizing analog image data produced using a CCD without affecting the entire image, thereby correcting the image.

The invention claimed is:

1. An image processing apparatus comprising image data storing means for storing digital image data obtained by photoelectrically detecting light with a CCD to produce analog image data and digitizing the analog pixel data, memory means for two-dimensionally mapping and storing the digital image data stored in the image data storing means, and abnormal pixel determining means for specifying each pixel in the digital image data stored in the memory means as a subject pixel, reading density signal level of the subject pixel together with density signal levels of pixels adjacent to the subject pixel, comparing the density signal level of the subject pixel with the density signal levels of pixels adjacent to the subject pixel and defining the subject pixel as an abnormal pixel when difference between the density signal level of the subject pixel and the density signal levels of pixels adjacent to the subject pixel is greater than a predetermined level, wherein the abnormal pixel determining means is constituted so as to calculate an average value A, the maximum value MAX and the minimum value MIN of the density signal levels of pixels adjacent to each subject pixel and judge that the difference between the density signal level of the subject pixel and the density signal levels of the pixels adjacent to the subject pixel is greater than the predetermined level when the density signal level x of the subject pixel satisfies:

$x > A + (MAX - MIN)*n$, or $x < A - (MAX - MIN)*n$ wherein n is a positive constant.

2. An image processing apparatus in accordance with claim 1 wherein the positive constant n is set between 1 and 2.

3. An image processing apparatus in accordance with claim 1 wherein the abnormal pixel correcting means is constituted so as to correct the density signal level of each subject pixel in such a manner that the corrected density signal level is equal to an average value of the density signal levels of the pixels adjacent to the subject pixel excluding the pixels whose density signal levels have the maximum value and the minimum value.

4. An image processing apparatus in accordance with claim 3 wherein the pixels adjacent to the subject pixel are the group of pixels obtained by excluding the subject pixel from 3*3 pixels including the subject pixel as a center pixel.

5. An image processing apparatus in accordance with claim 1 wherein the pixels adjacent to the subject pixel are the group of pixels obtained by excluding the subject pixel from 3*3 pixels including the subject pixel as a center pixel.

6. An image processing apparatus comprising:
image data storing means for storing digital image data obtained by photoelectrically detecting light with a CCD to produce analog image data and digitizing the analog pixel data,
memory means for two-dimensionally mapping and storing the digital image data stored in the image data storing means,
abnormal pixel determining means for specifying each pixel in the digital image data stored in the memory means as a subject pixel, reading density signal level of the subject pixel together with density signal levels of pixels adjacent to the subject pixel, comparing the density signal level of the subject pixel with the density signal levels of pixels adjacent to the subject pixel and defining the subject pixel as an abnormal pixel when difference between the density signal level of the subject pixel and the density signal levels of pixels adjacent to the subject pixel is greater than a predetermined level, and
abnormal pixel correcting means for correcting the density signal level of each subject pixel in accordance with the density signal levels of the pixels adjacent to the subject pixel when the subject pixel is defined as an abnormal pixel by the abnormal pixel determining means,
wherein the abnormal pixel determining means is constituted so as to calculate an average value A, the maximum value MAX and the minimum value MIN of the density signal levels of pixels adjacent to each subject pixel and judge that the difference between the density signal level of the subject pixel and the density signal levels of the pixels adjacent to the subject pixel is greater than the predetermined level when the density signal level x of the subject pixel satisfies:

$x > A + (MAX - MIN)*n$, or $x < A - (MAX - MIN)*n$ wherein n is a positive constant.

7. An image processing apparatus in accordance with claim 6 wherein the positive constant n is set between 1 and 2.

8. An image processing apparatus in accordance with claim 6 wherein the abnormal pixel correcting means is constituted so as to correct the density signal level of each subject pixel in such a manner that the corrected density signal level is equal to an average value of the density signal levels of the pixels adjacent to the subject pixel excluding the pixels whose density signal levels have the maximum value and the minimum value.

9. An image processing apparatus in accordance with claim 8 wherein the pixels adjacent to the subject pixel are the group of pixels obtained by excluding the subject pixel from 3*3 pixels including the subject pixel as a center pixel.

10. An image processing apparatus in accordance with claim 6 wherein the pixels adjacent to the subject pixel are the group of pixels obtained by excluding the subject pixel from 3*3 pixels including the subject pixel as a center pixel.

11. An image processing apparatus comprising
image data storing means for storing digital image data obtained by photoelectrically detecting light with a CCD to produce analog image data and digitizing the analog pixel data,
memory means for two-dimensionally mapping and storing the digital image data stored in the image data storing means, and
abnormal pixel determining means for specifying each pixel in the digital image data stored in the memory means as a subject pixel, reading density signal level of the subject pixel together with density signal levels of pixels adjacent to the subject pixel, comparing the density signal level of the subject pixel with the density signal levels of pixels adjacent to the subject pixel and defining the subject pixel as an abnormal pixel when difference between the density signal level of the subject pixel and the density signal levels of pixels adjacent to the subject pixel is greater than a predetermined level,
wherein the abnormal pixel determining means is constituted so as to determine whether the density signal level of each subject pixel is higher than a maximum value of the density signal levels of the pixels adjacent to the subject pixel and whether or not the density signal level of the subject pixel is lower than a minimum value of the density signal levels of the pixels adjacent to the subject pixel, and judge whether or not the difference between the density signal level of the subject pixel and the density signal levels of pixels adjacent to the subject pixel is greater than the predetermined level when the density signal level of the subject pixel is higher than the maximum value of the density signal levels of the pixels adjacent to the subject pixel or when the density signal level of the subject pixel is lower than the minimum value of the density signal levels of the pixels adjacent to the subject pixel, and
wherein the abnormal pixel determining means is constituted so as to calculate an average value A, the maximum value MAX and the minimum value MIN of the density signal levels of pixels adjacent to each subject pixel and judge that the difference between the density signal level of the subject pixel and the density signal levels of the pixels adjacent to the subject pixel is greater than the predetermined level when the density signal level x of the subject pixel satisfies:

$x > A + (MAX - MIN)*n$, or $x < A - (MAX - MIN)*n$ wherein n is a positive constant.

12. An image processing apparatus in accordance with claim 11 wherein the positive constant n is set between 1 and 2.

13. An image processing apparatus in accordance with claim 11 wherein the abnormal pixel correcting means is constituted so as to correct the density signal level of each subject pixel in such a manner that the corrected density signal level is equal to an average value of the density signal levels of the pixels adjacent to the subject pixel excluding the pixels whose density signal levels have the maximum value and the minimum value.

14. An image processing apparatus in accordance with claim 13 wherein the pixels adjacent to the subject pixel are the group of pixels obtained by excluding the subject pixel from 3*3 pixels including the subject pixel as a center pixel.

15. An image processing apparatus in accordance with claim 11 wherein the pixels adjacent to the subject pixel are the group of pixels obtained by excluding the subject pixel from 3*3 pixels including the subject pixel as a center pixel.

16. An image processing apparatus comprising
image data storing means for storing digital image data obtained by photoelectrically detecting light with a CCD to produce analog image data and digitizing the analog pixel data,
memory means for two-dimensionally mapping and storing the digital image data stored in the image data storing means,
abnormal pixel determining means for specifying each pixel in the digital image data stored in the memory means as a subject pixel, reading density signal level of the subject pixel together with density signal levels of pixels adjacent to the subject pixel, comparing the density signal level of the subject pixel with the density signal levels of pixels adjacent to the subject pixel and defining the subject pixel as an abnormal pixel when difference between the density signal level of the subject pixel and the density signal levels of pixels adjacent to the subject pixel is greater than a predetermined level, and
abnormal pixel correcting means for correcting the density signal level of each subject pixel in accordance with the density signal levels of the pixels adjacent to the subject pixel when the subject pixel is defined as an abnormal pixel by the abnormal pixel determining means,
wherein the abnormal pixel determining means is constituted so as to determine whether the density signal level of each subject pixel is higher than a maximum value of the density signal levels of the pixels adjacent to the subject pixel and whether or not the density signal level of the subject pixel is lower than a minimum value of the density signal levels of the pixels adjacent to the subject pixel, and judge whether or not the difference between the density signal level of the subject pixel and the density signal levels of pixels adjacent to the subject pixel is greater than the predetermined level when the density signal level of the subject pixel is higher than the maximum value of the density signal levels of the pixels adjacent to the subject pixel or when the density signal level of the subject pixel is lower than the minimum value of the density signal levels of the pixels adjacent to the subject pixel, and
wherein the abnormal pixel determining means is constituted so as to calculate an average value A, the maximum value MAX and the minimum value MIN of the density signal levels of pixels adjacent to each subject pixel and judge that the difference between the density signal level of the subject pixel and the density signal levels of the pixels adjacent to the subject pixel is greater than the predetermined level when the density signal level x of the subject pixel satisfies:

$x > A + (MAX - MIN) * n$, or $x < A - (MAX - MIN) * n$ wherein n is a positive constant.

17. An image processing apparatus in accordance with claim 16 wherein the positive constant n is set between 1 and 2.

18. An image processing apparatus in accordance with claim 16 wherein the abnormal pixel correcting means is constituted so as to correct the density signal level of each subject pixel in such a manner that the corrected density signal level is equal to an average value of the density signal levels of the pixels adjacent to the subject pixel excluding the pixels whose density signal levels have the maximum value and the minimum value.

19. An image processing apparatus in accordance with claim 18 wherein the pixels adjacent to the subject pixel are the group of pixels obtained by excluding the subject pixel from 3*3 pixels including the subject pixel as a center pixel.

20. An image processing apparatus in accordance with claim 16 wherein the pixels adjacent to the subject pixel are the group of pixels obtained by excluding the subject pixel from 3*3 pixels including the subject pixel as a center pixel.

21. An image processing apparatus comprising
image data storing means for storing digital image data obtained by photoelectrically detecting light with a CCD to produce analog image data and digitizing the analog pixel data,
memory means for two-dimensionally mapping and storing the digital image data stored in the image data storing means, and
abnormal pixel determining means for specifying each pixel in the digital image data stored in the memory means as a subject pixel, reading density signal level of the subject pixel together with density signal levels of pixels adjacent to the subject pixel, comparing the density signal level of the subject pixel with the density signal levels of pixels adjacent to the subject pixel and defining the subject pixel as an abnormal pixel when difference between the density signal level of the subject pixel and the density signal levels of pixels adjacent to the subject pixel is greater than a predetermined level,
wherein the abnormal pixel determining means is constituted so as to compare the density signal level of the subject pixel with a threshold, wherein the threshold is a deviation from an average of density signal levels of pixels adjacent to the subject pixel, and
wherein the deviation is a factor of the range of density signal levels of the adjacent pixels.

22. An image processing apparatus comprising
image data storing means for storing digital image data obtained by photoelectrically detecting light with a CCD to produce analog image data and digitizing the analog pixel data,
memory means for two-dimensionally mapping and storing the digital image data stored in the image data storing means, and
abnormal pixel determining means for specifying each pixel in the digital image data stored in the memory means as a subject pixel, reading density signal level of the subject pixel together with density signal levels of pixels adjacent to the subject pixel, comparing the density signal level of the subject pixel with the density signal levels of pixels adjacent to the subject pixel and defining the subject pixel as an abnormal pixel when difference between the density signal level of the subject pixel and the density signal levels of pixels adjacent to the subject pixel is greater than a predetermined level, wherein the subject pixel is defined as an abnormal pixel when the density signal level of the subject pixel is not within a range of deviation from a mean of adjacent pixel values, wherein the range of deviation is a factor of the difference between a maximum value of the density signal levels of the adjacent pixels and a minimum value of the density signal levels of the adjacent pixels.

23. An image processing method, comprising:
photoelectrically detecting light with a CCD to produce analog image data;
digitizing the analog image data;
two-dimensionally mapping the digitized image data;
specifying a subject pixel from the mapped image data;
reading a density signal level of the subject pixel together with density signal levels of pixels adjacent to the subject pixel;
comparing the density signal level of the subject pixel with the density signal levels of pixels adjacent to the subject pixel; and
defining the subject pixel as an abnormal pixel when a difference between the density signal level of the subject pixel and the density signal levels of pixels adjacent to the subject pixel is greater than a predetermined level,
wherein said comparing comprises comparing the density signal level of the subject pixel with a threshold, wherein said threshold is a deviation from an average of density signal levels of pixels adjacent to the subject pixel, and
wherein said deviation is a factor of the range of density signal levels of the adjacent pixels.

24. An image processing method, comprising:
photoelectrically detecting light with a CCD to produce analog image data;
digitizing the analog image data;
two-dimensionally mapping the digitized image data;
specifying a subject pixel from the mapped image data;
reading a density signal level of the subject pixel together with density signal levels of pixels adjacent to the subject pixel;
comparing the density signal level of the subject pixel with the density signal levels of pixels adjacent to the subject pixel; and
defining the subject pixel as an abnormal pixel when a difference between the density signal level of the subject pixel and the density signal levels of pixels adjacent to the subject pixel is greater than a predetermined level,
wherein the subject pixel is defined as an abnormal pixel when the density signal level of the subject pixel is not within a range of deviation from a mean of adjacent pixel values, wherein the range of deviation is a factor of the difference between a maximum value of the density signal levels of the adjacent pixels and a minimum value of the density signal levels of the adjacent pixels.

25. An image processing method comprising:
photoelectrically detecting light with a CCD to produce analog image data;
digitizing the analog image data;
two-dimensionally mapping the digitized image data;
specifying a subject pixel from the mapped image data;
reading a density signal level of the subject pixel together with density signal levels of pixels adjacent to the subject pixel;
comparing the density signal level of the subject pixel with the density signal levels of pixels adjacent to the subject pixel; and
defining the subject pixel as an abnormal pixel when a difference between the density signal level of the subject pixel and the density signal levels of pixels adjacent to the subject pixel is greater than a predetermined level,
wherein said comparing further comprises calculating an average value A, the maximum value MAX and the minimum value MIN of the density signal levels of pixels adjacent to each subject pixel and judge that the difference between the density signal level of the subject pixel and the density signal levels of the pixels adjacent to the subject pixel is greater than the predetermined level when the density signal level x of the subject pixel satisfies:

$$x > A + (MAX - MIN) * n, \text{ or}$$

$$x < A - (MAX - MIN) * n$$

wherein n is a positive constant.